United States Patent
Jowett

(10) Patent No.: US 6,270,661 B1
(45) Date of Patent: Aug. 7, 2001

(54) SYSTEM FOR INFILTRATING WATER INTO THE GROUND

(76) Inventor: E. Craig Jowett, 177 Cobblestone Place, Box 385, Rockwood, Ontario (CA), N0B 2K0

( * ) Notice: Subject to any disclaimer, the term of this patent is extended or adjusted under 35 U.S.C. 154(b) by 0 days.

(21) Appl. No.: 09/558,592

(22) Filed: Apr. 26, 2000

(51) Int. Cl.[7] .................................................. C02F 3/30
(52) U.S. Cl. .................... 210/151; 210/170; 210/532.2; 210/903; 210/258; 405/43; 405/46
(58) Field of Search ........................ 210/150, 151, 210/170, 532.2, 903, 541, 542, 258, 259; 405/43, 44, 45, 46

(56) References Cited

U.S. PATENT DOCUMENTS

| | | | |
|---|---|---|---|
| 315,629 | * | 4/1885 | Jessup ..................................... 405/43 |
| 1,832,967 | | 11/1931 | Craig . |
| 1,989,427 | * | 1/1935 | Robey ..................................... 405/44 |
| 2,366,522 | * | 1/1945 | Gutman ................................... 405/46 |
| 2,782,604 | * | 2/1957 | Mixon ..................................... 405/46 |
| 2,803,948 | * | 8/1957 | Dorfman ................................. 405/46 |
| 3,339,365 | * | 9/1967 | Uden ....................................... 405/43 |
| 3,407,608 | | 10/1968 | Whitehead ............................... 61/13 |
| 3,446,025 | * | 5/1969 | Koch ....................................... 405/43 |
| 3,919,848 | * | 11/1975 | Sullivan ................................... 210/170 |
| 4,721,408 | | 1/1988 | Hewlett ................................... 405/48 |
| 5,083,885 | | 1/1992 | Ushitora et al. ......................... 405/36 |
| 5,318,699 | * | 6/1994 | Robertson et al. ..................... 210/532.2 |
| 5,322,387 | | 6/1994 | Heine et al. ............................. 405/36 |
| 5,382,363 | * | 1/1995 | Boylon .................................... 210/176 |
| 5,810,509 | | 9/1998 | Nahlik, Jr. ............................... 405/43 |
| 5,823,711 | | 10/1998 | Herd et al. .............................. 405/36 |
| 5,895,569 | | 4/1999 | Connelly ................................. 210/170 |
| 5,921,711 | * | 7/1999 | Sipailn .................................... 205/45 |
| 5,958,239 | * | 9/1999 | Sing ........................................ 210/532.2 |

* cited by examiner

Primary Examiner—Christopher Upton
(74) Attorney, Agent, or Firm—Anthony Asquith & Co.

(57) ABSTRACT

Water from a septic tank is aerated, at an above-ground aeration station. The aerated water is infiltrated onto the floor of a trench in the ground through drainage holes in a pipe. The pipe is pressurized with water during dosing. The pipe is arranged to sag down between support posts, whereby water drains completely out of the pipe between dosings, evenly along the length of the pipe.

14 Claims, 2 Drawing Sheets

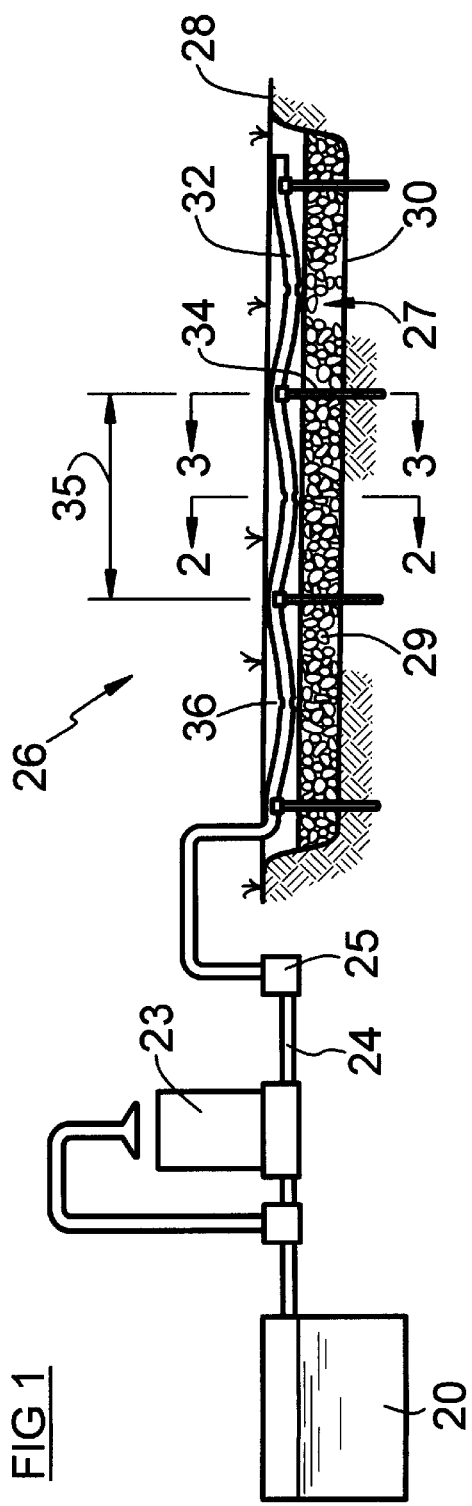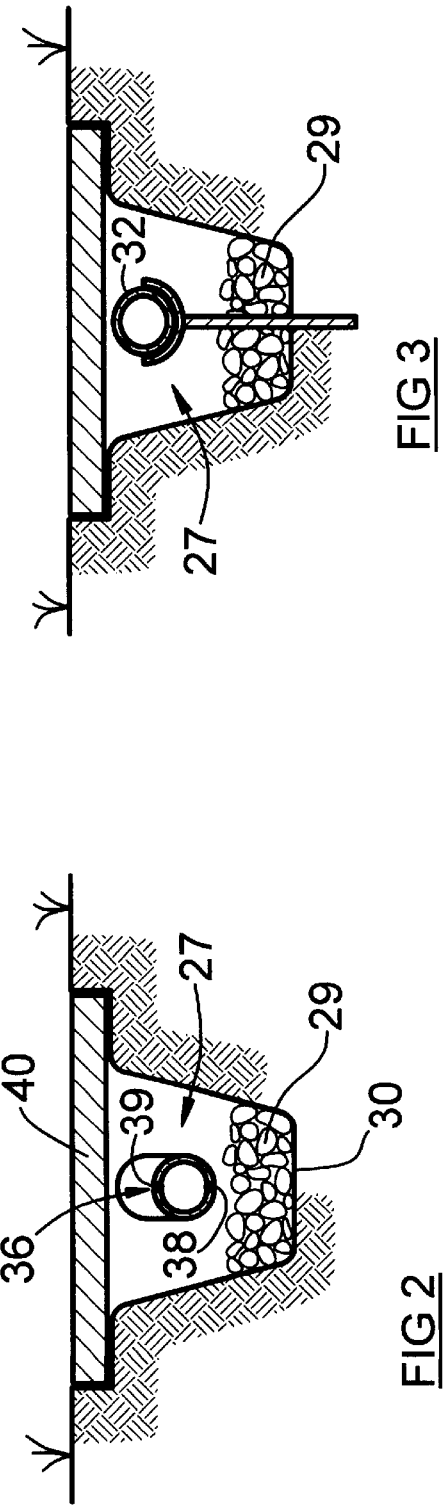

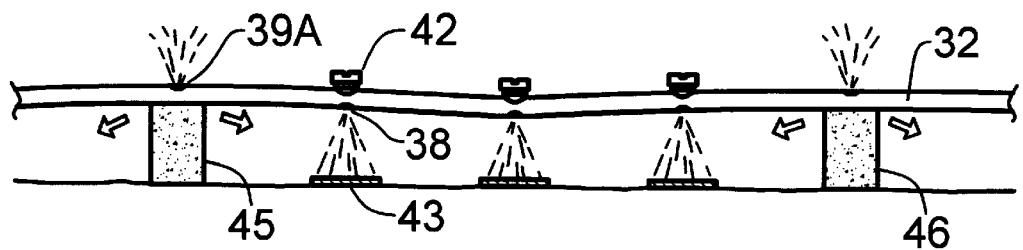
FIG 4
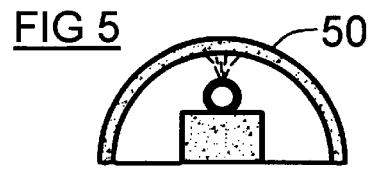
FIG 5
FIG 6a
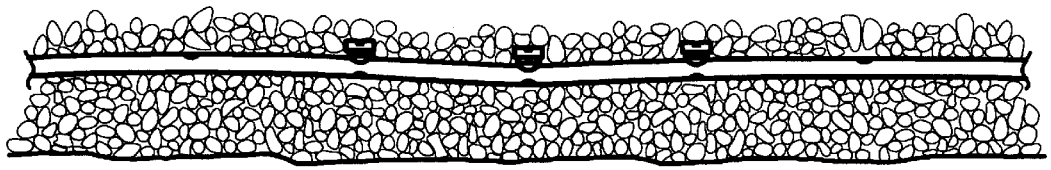
FIG 6
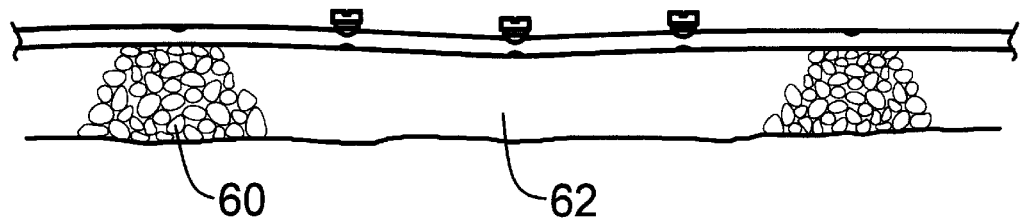

SYSTEM FOR INFILTRATING WATER INTO THE GROUND

This invention relates to a system for infiltrating water into the ground. The water may be water received from a domestic septic tank treatment system, or the like.

BACKGROUND TO THE INVENTION

Water from a domestic septic tank system contains organic matter (BOD), dissolved ammonium, etc, and needs to be aerated. Aeration oxidises the ammonium to nitrate, and cleanses the water of the BOD. Often, in conventional systems, a tile-bed soakaway, or the like, is provided, whereby the ammonium-containing (and BOD-containing) water is trickled onto and into the ground, where it is exposed to oxygen (from the atmosphere).

In that case, the function of aerating the water, and the function of infiltrating the water into the ground, are not separated, but are combined in the soakaway. The idea is that the water that passes down into the groundwater below the soakaway, having been through an aeration phase, in the soil, has had all its ammonium converted to nitrate, and its BOD into carbon dioxide and water, as the water passes into the aquifer.

The conventional tile-bed soakaway has not been satisfactory in some cases, usually because the water passing through the soakaway has not been aerated enough. In those cases, a separate water-aeration station may be utilised, in which the aerobic reactions can be completed, and can be seen to be completed, before the water is infiltrated into the ground. Such a separate water-aeration apparatus may be of the kind as disclosed in USA patent U.S. Pat. No. 5,762,784 (Jowett, June 1998).

When the water aeration treatment takes place in a separate aeration station, as in the above patent, the water then remains to be infiltrated into the ground. The invention is concerned with the system by means of which fully treated water may be infiltrated into the ground. The system of the invention may also be used with water that has been only partially pre-aerated, at a separate aeration station, and the final aeration takes place as the water is being infiltrated into the ground. The system of the invention may also be used with water that has not been pre-aerated at all, although that is less preferred.

The invention, preferably, is intended for use with treatment systems in which the water from the septic tank is subjected to the aerobic treatment before the water reaches the ground. Here, the aerobic reactions are enabled and promoted in e.g an above-ground aerobic facility. It is recognised that it is much easier to design the overall or whole system to operate efficiently, when the facility that handles the aerobic treatment chemistry is separate from the facility that handles the physical infiltration of the water into the ground. When the aeration-facility and the infiltration-facility are combined, as in the traditional tile-bed soakaway, the function of each is compromised by the need to accommodate the other.

The sagging-pipe infiltration system, as described herein, is aimed at addressing the above points. The sagging-pipe infiltration system may be used when the water entering the infiltration system is untreated, i.e when the water is effluent water straight from the septic tank. However, that manner of use is not preferred, because in that case some build-up of slimes and solids can occur, depending on such parameters as temperature, frequency of dosing, etc. The use of the infiltration system is preferred in cases where the water has been more or less completely aerated before being infiltrated into the ground.

On the other hand, it is preferred sometimes to use the sagging-pipe infiltration system in cases where only some of the aeration pre-treatment has taken place, for example when the aeration station is sized so as to cope with only the normal dosings of water. Then, any heavy dosings that might occur will result in some untreated water passing to the infiltration system. Under heavy dosing, the extra aerobic treatment would then have to take place on and in the ground, while the aerobic treatment of normal dosings would take place wholly in the aeration station.

In the sagging-pipe infiltration system, as described herein, the aim is that water can drain substantially completely from the pipe, along the whole length of the pipe, between dosings.

Another aim of the sagging-pipe infiltration system, as described herein, is that the water drains from the pipe evenly, along the length of the pipe. The water drains into a trench, or the like, underneath the pipe. As the designer of the system becomes confident that the water will be deposited very evenly in the trench, so the designer can take advantage of the resulting efficiency, to minimise the total size of the trench.

It is an aim of the invention to provide a system in which, during dosings, the pipe is completely filled with water, and pressurised, as a way of ensuring evenness of expulsion of water from the pipe, and in which water drains completely from the pipe between dosings.

A system in which the pipe did not drain completely would be unsatisfactory, because the residual water would freeze in cold weather, and at least partially block the pipe. In warm weather, water left in the pipe could become stagnant, leading to slime build-up between dosings.

DETAILED DESCRIPTION OF PREFERRED EMBODIMENTS

By way of further explanation of the invention, exemplary embodiments of the invention will now be described with reference to the accompanying drawings, in which:

FIG. 1 is a diagrammatic cross-sectioned side elevation of a domestic water sewage treatment system, having a means for infiltrating the treated water into the ground, which embodies the invention.

FIG. 2 is a cross-section on line 2—2 of FIG. 1.

FIG. 3 is a cross-section on line 3—3 of FIG. 1.

FIG. 4 is corresponding view to FIG. 1 of another system that embodies the invention.

FIG. 5 is a cross-section corresponding to FIG. 3 of another embodiment.

FIGS. 6 and 6a are corresponding views to FIG. 1 of another system that embodies the invention.

The apparatuses shown in the accompanying drawings and described below are examples which embody the invention. It should be noted that the scope of the invention is defined by the accompanying claims, and not necessarily by specific features of exemplary embodiments.

FIG. 1 shows a domestic septic tank 20, which receives raw sewage from the house. The effluent water from the septic tank 20, having undergone settling and the usual anaerobic treatment, is pumped into an aerator 23. Here, the aerobic water treatment reactions are enabled and promoted. In this case, the aerator 23 is of the kind as described in the said U.S. Pat. No. 5,762,784.

Treated water from the aerator 23 is collected in a pipe 24, and is pumped away to the water infiltration apparatus 26, from which the water is infiltrated onto and into the ground.

The infiltration apparatus 26 is placed in a trench 27, which is excavated down from the ground surface 28. On the floor of the trench rests a quantity of broken stones, rocks, sand, pebbles, gravel, etc 29, as required in view of the nature of the ground or soil 30 below the trench 27. In some cases, the floor of the trench may be constituted by the native soil.

A length of pipe 32 is placed on a series of support posts 34. The posts can be adjusted to be all at the same height, or to have a slight progressive slope, or to follow the contours of the trench, as required.

The support posts are spaced apart and pipe is of such flexibility that the sag-lengths 35 of the pipe 32 between the support posts 34 sags down. Typically, the designer will place the support posts 1.5 to 3 meters apart, and the pipe 32 should be of such dimensions and material as to sag down, under its own weight, about 5 cm over that distance. (When the pipe 32 is full of water, it can be expected to sag perhaps double that amount.)

In a typical case, the pipe is made of semi-rigid PVC or polyethylene, schedule-40, and the nominal diameter of the pipe is typically about 35 mm. The range of pipe sizes with which the invention can be used most advantageously is 25 to 50 nm. A 35 mm pipe will sag satisfactorily when placed on supports spaced about 3 meters apart.

In a typical case, the pipe 32 might be say 30 meters long, and have perhaps ten or fifteen sags. At the lowest point of each sag, a through-hole 36 is drilled right through the pipe. The pipe should be installed on the support posts 34 (and may be secured in place by clips, or other suitable means) before the holes 36 are drilled. This ensures the holes are in the right places, and at the right orientations, relative to the sags. Some care should be taken to position the through-holes 36 correctly the first time, since too many holes in the pipes can be disadvantageous.

The apparatus is under automatic control. Water from the septic tank 20 is allowed to accumulate until a pre-determined dose-volume (DV liters, typically being 100 or 200 liters) has accumulated. When that happens, a dose cycle is started. The pump 25 is activated, and a fixed volume of water (the dose volume, DV liters) is pumped into the sagging pipe 32. As water enters the pipe, and starts to fill the pipe (this is the pipe-filling phase of the dose cycle), some water starts to trickle out through drain-holes in the pipe. The drain-holes 38 are the portions of the through-holes 36 that pass through the bottom wall of the pipe. The water drains from the drain-holes 38 and onto the stones 29 in the trench 27. However, the flow rate at which the water is pumped into the pipe 32 (FR liters per minute) is fast enough that the whole length of the pipe 32 quickly becomes filled with water, despite the fact that water is escaping from the drain-holes 38.

Once the pipe 32 is full, the pump 25 is now able to pressurise the water in the pipe (this is the pipe-full phase of the dose cycle), whereupon the water, instead of just trickling out of the drain-holes 38, now is forced out of the drain-holes in a jet. In fact, the water not only jets out downwards through the drain-holes 38, but also jets out upwards through the drilled holes 39 in the top of the pipe. To catch this upward-jetting water, cover 40 is placed over the trench 27, and over the pipe 32. Of course, the cover 40 would pref be provided in any event, to keep the trench covered.

After the dose volume DV has been pumped into the pipe, the pump 25 stops, and the pipe-emptying phase of the dose cycle commences. The water remaining in the pipe trickles out through the drain7 holes 38, at a gradually decreasing rate as the pipe empties. At the end of the dose-cycle, the pipe should be more or less completely empty of water.

It is desirable that, during a dosing cycle, most of the water should be discharged from the pipe during the pipe-full, pipe-pressurised, phase of the dose cycle. When the pipe is pressurised, it can be expected that the water will emerge at more or less the same rate from each hole, assuming the holes are all drilled the same size. However, during the pipe-filling phase, i.e before the pipe can be pressurised, of course the water will start to trickle out of the holes that are nearer the pump end of the pipe than through the holes that are more distant. Therefore, the pipe-filling phase of the dose-cycle should be completed quickly, because this is a period when the discharge is uneven, and it should be minimised. Preferably, the flow rate FR of water into the pipe during the pipe-filling (first) phase should be fast enough that the pipe-filling phase lasts for a time period of no more than about 20 percent of the pipe-full (second) phase of the dose cycle. For the same reason, the number of holes in the pipe should not be too many; many holes would mean the pipe would take longer to fill, and to be pressurised. One 5 mm drilled hole per sag-length 35 should be enough. However, more than one hole per sag-length may be provided, if desired.

To ensure that most of the water is discharged during the pipe33 full, pressurised phase, the dose-volume DV of water should be substantially greater than the volume capacity of the pipe, PV. Preferably, the dose-volume DV liters should be set at least three times the pipe volume PV liters.

The pipe-emptying (third) phase of the dosing cycle may be slower, as the last of the dose of water drains out through the drain holes 38. As the pipe 32 empties, the amount of sag of the pipe is such that the water breaks up into isolated or separated volumes, one volume to each sag-length 35 of the pipe 32. Each drain-hole accommodates its own volume, i.e., its own isolated volume, so the drainage flow remains fairly even (i.e., the same flow from each drain-hole) until the pipe is quite empty. Speed of discharge is not important in the pipe-emptying phase (except that it should not be so slow that the water might freeze, in cold weather, before it can drain out of the pipe).

In the pipe-emptying phase, it will be understood that water lying in the sag-length 35 between the supports 45,46 (FIG. 4) drains centrally, through the three drain-holes 38 as shown. Water lying in the sag-length to the left of support 45 drains leftwards, and out of the drain-holes lying to the left of FIG. 4; water lying in the sag-length to the right of support 46 drains rightwards, and out of the drain holes lying to the right of FIG. 4. Thus, in the pipe-emptying phase, the supports 45,46 define watersheds. The total volume of water in the pipe splits up into smaller volumes, one to each sag-length, and the volume in each sag-length drains out through the respective drain-hole(s) of that sag-length.

In the sagging-pipe apparatus, as described, the water is discharged evenly though all the drain holes, in the pipe-full (second) phase of the dosing cycle, and in the pipe-emptying (third) phase. It is only in the pipe-filling (first) phase of the dosing cycle that water tends to drain more from some holes than from others, and the first phase can be kept short by ensuring the pipe is filled quickly.

Thus, the uneven draining associated with the first phase can be regarded as insignificant. That is to say, the system as described provides a system wherein water drains from the pipe, and infiltrates the ground, in periodic doses; wherein the volume of water that drains through any one of the drain-holes, throughout the whole dosing cycle, is very nearly the same as the volume of water draining from every other drain-hole; and wherein the pipe empties itself, substantially completely, between dosings. These characteristics render the system as described highly advantageous.

The fact that the pipe discharges completely, between dosings, is of course advantageous in freezing weather. Septic tanks that are in use in winter seldom freeze, and the effluent water is warm enough that the dosing cycle can be completed, and the water can be infiltrated into the ground before it freezes. If any water were to remain in the pipe, it would freeze, and block at least the drain holes, if not the pipe itself. However, the benefit of the complete emptying of the pipe, between dosings, lies not only in the avoidance of the bad effects of freezing. There will often be at least a residual amount of organic material (BOD) in the water in the pipe, and if the water were to be left in the pipe, between dosings, even in summer, solids (slime) perhaps might form in the pipe, and such solids might be enough to inhibit, or even block, the flow rate of water out of the drain-holes, and in the pipe itself.

The fact that the water is discharged evenly, i.e., evenly through all the drain-holes, is very important. An infiltration system for a water treatment apparatus must be able to operate properly for many years. However, whenever water is discharged from many holes, the tendency, as the years go by, is for the water to gradually develop preferred pathways, whereby flow rates become uneven. The result can be local pooling, or flooding, at certain locations within the drainage trench, while other locations in the trench remain dry. If this happens, especially in cases where the groundsoil provides less than ideal drainage, it can lead to incomplete or improper treatment of the water, backing up, flooding, etc. The sagging-pipe system, as described, provides a great degree of evenness of water discharge, drain-hole to drain-hole, not only during the pipe-full pressurised phase of the dosing cycle, but also in the pipe-draining final phase of the dosing cycle, and this evenness can be expected to extend well into the service life of the system. The sagging-pipe system combines this advantageous evenness of water-distribution with the advantage that the pipe is completely emptied between dosings.

In some types of groundsoil, and particularly in clay soils, the floor of the trench has to be horizontal, or almost so. If the floor of the trench were to slope, the draining water might tend to flow along the trench, and to pool in the lowermost spots. This would spoil the drainage efficiency of the trench. A trench of a particular capacity disposes of the water with the best efficiency when the whole trench is performing evenly. Where the trench has to be horizontal, of course the pipe has to be horizontal also. The sagging-pipe system is advantageous in that case, in ensuring complete and even emptying of the pipe, when the overall disposition of the pipe is horizontal. The support posts 34 can be readily adjusted until they are all at the same height.

As mentioned, the drain holes are drilled down into the plastic pipe material from above, after the sagging-pipe itself has been installed. This ensures that the drainage-holes are correctly orientated at the bottom of the pipe, and in the centres of the sag-lengths. (Depending on the flow requirements of the particular system, other drainage-holes may be drilled in the sag-length, at locations other than the centre of the sag.) The drainage-holes in the bottom of the pipe, having been drilled from above, tend to have no burrs on the inside of the pipe. This is useful in that burrs, if present, might tend to interfere with complete draining, and might provide a basis for organisms (slime) to collect and accumulate. It is preferred not to drill the holes upwards from underneath, because then burrs would be left, inside the pipe (which would be virtually impossible to remove).

If desired, plugs 42 (FIG. 4) may be inserted in the top-holes 39. The plug will stop water jetting upwards when the pipe is full of water, and pressurised. To enable the pipe to be filled more completely, it is preferred to provide top-holes 39A actually at the points of support, where the sagging pipe is at its highest, in order to let air out of the pipe. FIG. 4 shows a typical arrangement. The open top-holes 39A also let air in, which is useful during the pipe-draining (final) phase of the dose-cycle, to enable the water to drain freely from the pipe.

Sometimes, water jetting downwards from the drainage-holes 38 can lead to silting-up of the floor of the trench, because the jet gradually causes fine particles to enter crannies in the floor. As is done in conventional pressurised-pipe infiltration systems, a splash-stone 43 may be placed under each drain hole, in the path of the jet. In place of the stone 43, an asphalt shingle or other suitable item may be used. Smaller pebbles may be placed and arranged around the main stone, in such a way as to ensure that all the kinetic energy of the jetting water is dissipated before the water reaches the actual soil, whereby the tendency for the finer particles of the soil to be carried or driven into the crannies of the soil is minimised.

The pipe 32 is disposed with the sag-lengths in series, i.e the one length of pipe includes all the sag-lengths, and all the sag-lengths are disposed in one long trench. In an alternative layout, the sag-lengths may be arranged in parallel. The aim is to drain the whole pipe completely, between dosings, and this can still be done when the pipes are in parallel.

As shown in FIG. 5, there need not be an excavated trench, as such. Instead, the sagging pipe is placed on supports above the ground surface. A plastic or concrete pipe, or half-pipe 50, serves as a tunnel, to physically protect the pipe.

Crushed stone on the trench floor serves to distribute the water falling from the holes in the sagging pipe evenly along the length of the trench. In a case where the pipe is roofed over with an inverted half-pipe, the stones also serve to support the half-pipe, and prevent it sinking into the soil.

As shown in FIGS. 6,6a, instead of the pipe simply being left resting on the supports, the trench may be filled right up with crushed stones, or the like, the stones being filled in around the sagging pipe. First the pipe is placed on the built-up supports 60 (FIG. 6). Then, after the pipe has adopted the sagging configuration, and the holes have been drilled, the rest of the space 62 is filled in (FIG. 6a). Some plastic materials can undergo creep, over a period of time, whereby the degree of sag of the pipe might increase, if the pipe is simply left. Supporting the sagging pipe in the stones prevents this possibility. A filter cloth should be incorporated into the heap of stones to keep fine soil particles from clogging the stones.

As to the size of the sagging pipe, this is determined according to required dosing rates, the type of water, etc. If the water is clean, and aerated, and the sagging pipe installation is being used ground, the pipe may be relatively small, e.g 25–35 mm diameter, and the drilled holes in the 3–6 mm range. If the water is not-yet-aerated septic tank effluent, the pipe should be 35–50 mm diameter, and the holes 6–12 mm. In each case, the designer of the system will need to size the pump to suit the size of pipe, to ensure the pipe is properly dosed and filled.

What is claimed is:

1. Apparatus for infiltrating water into the, ground, wherein:
    the apparatus includes a discharge pipe, the walls of which define a hollow interior chamber; the pipe has an entry port, for receiving doses of the water to be infiltrated, into the hollow interior chamber;
    the apparatus includes an operable dosing means, which is operable on a periodic basis, and which is effective, when operated, to supply a dose-volume of water into the entry port;
    the apparatus includes a pipe-support-structure, which is suitable for supporting the pipe above the surface of the ground into which the water is to be infiltrated;
    the pipe-support-structure includes a plurality of supports, the supports being so arranged as to support the pipe at intervals, the lengths of the pipe between the supports being termed the sag-lengths;
    the pipe has such a degree of structural flexibility that the sag-lengths of the pipe substantially sag down;
    in respect of each sag-length, the vertical distance through which the pipe sags down is large enough that a substantial volume of water can collect in the sag-length, and can become isolated in the sag-length, in the sense that water in the collected volume of water in the sag-length cannot flow along the pipe, and away from the sag-length, under the action of gravity alone;
    the pipe is provided with drain-holes, the drain-holes being disposed respectively in each of the sag-lengths of the pipe;
    the respective drain-holes are so arranged in relation to the sag-lengths of the pipe that water in the sag-lengths can drain out of the drain-holes;
    the respective drain-holes are so positioned in relation to the sag-lengths that the collected volumes of water in the sag-lengths can drain therefrom substantially completely, leaving each sag-length substantially completely empty.

2. Apparatus of claim 1, wherein:
    the hollow interior chamber is of such capacity as to hold a total pipe-volume PV liters of water;
    the dose-volume is DV liters;
    the dose-volume DV is substantially more than the pipe-volume PV, whereby the dose-volume is more than sufficient to completely fill the hollow interior chamber of the pipe.

3. Apparatus of claim 2, wherein
    the operable dosing means is so structured as to be effective, when operated, to supply a dose-volume of DV liters of water per dose, and to supply the volume DV at a flow rate of FR liters per minute;
    each drain-hole has a characteristic trickle-rate, TR liters/min, at which water trickles out of the drain-hole, and out of the pipe, the rate TR being the rate at which water trickles out of the drain-hole when the pipe is full of water, but not pressurised;
    an overall trickle rate, OTR liters/min, is the aggregate of the respective trickle rates TR of the plurality of drain holes;
    the rate OTR is slow enough, and the rate FR is fast enough, that, upon the dosing means being operated, the hollow interior chamber quickly becomes filled with water, whereby the chamber can then be pressurised;
    the apparatus includes a pressurising means, for pressurising the water in the chamber after the chamber is filled with water.

4. Apparatus of claim 3, wherein:
    the dosing means is configured to carry out a dosing cycle, which is a cycle of three phases, being a pipe-filling phase, a pipe-full phase, and a pipe-emptying phase, the phases being carried out sequentially and without pause therebetween;
    the pipe-filling phase is a phase which commences with the pipe empty, and in which the dosing means is operated, and the flow rate FR therefrom is large enough to cause the pipe to completely fill with water;
    the pipe-full phase is a phase which commences when the pipe is full of water, and the flow rate FR is large enough to pressurise the water in the pipe, whereby the water now jets out of the drain holes at the same flow rate FR;
    the pipe-emptying phase is a phase which commences when the dosing means stops operating, with the pipe filled and pressurised, whereby the water in the pipe becomes unpressurised, and the water trickles out of the drain holes, first at OTR, then at a gradually decreasing rate as the pipe empties, until the water is substantially all gone.

5. Apparatus of claim 4, wherein the pipe-volume PV, the dose-volume DV, the size of the drain holes, and the flow rate FR, are so configured that the pipe-filling phase lasts for a time that is no more than 20 percent of the time the pipe-full phase lasts.

6. Apparatus of claim 4, wherein the dose-volume DV is at least three times the pipe-volume PV.

7. Apparatus of claim 1, wherein the supports and the sag-lengths are disposed in series along the length of the pipe.

8. Apparatus of claim 1, wherein the pipe is substantially unsupported between the supports, and the pipe is flexible enough to sag down under its own weight, even when empty of water.

9. Apparatus of claim 1, wherein the apparatus includes a trench, excavated in the ground, and the surface of the ground into which the water is to be infiltrated is the floor of the trench.

10. Apparatus of claim 9, wherein the floor of the trench is substantially horizontal.

11. Apparatus of claim 1, wherein the water that is to be infiltrated is water from a water treatment system, and is water that has been cleaned and aerated.

12. Apparatus of claim 1, wherein the water that is to be infiltrated is water from a water treatment system, and the trench is structured and arranged so as to serve as a water aeration means.

13. Apparatus of claim 1, wherein:
    the drain-holes are in a bottom portion of the wall of the pipe;
    the drain-holes are holes that have been drilled down right through the pipe from above, after the sag-lengths of the pipe have sagged down, leaving top-holes corresponding to the drain holes in a top portion of the wall of the pipe.

14. Apparatus of claim 13, wherein:
    complementary holes are drilled down through a top portion of the wall of the pipe at the supports;
    the top-holes lying above the drain holes are plugged, and the complementary holes at the supports are open.

* * * * *